Sept. 11, 1962 J. L. MOHAR 3,053,476
SPACE VEHICLE
Filed Jan. 30, 1959 5 Sheets-Sheet 4
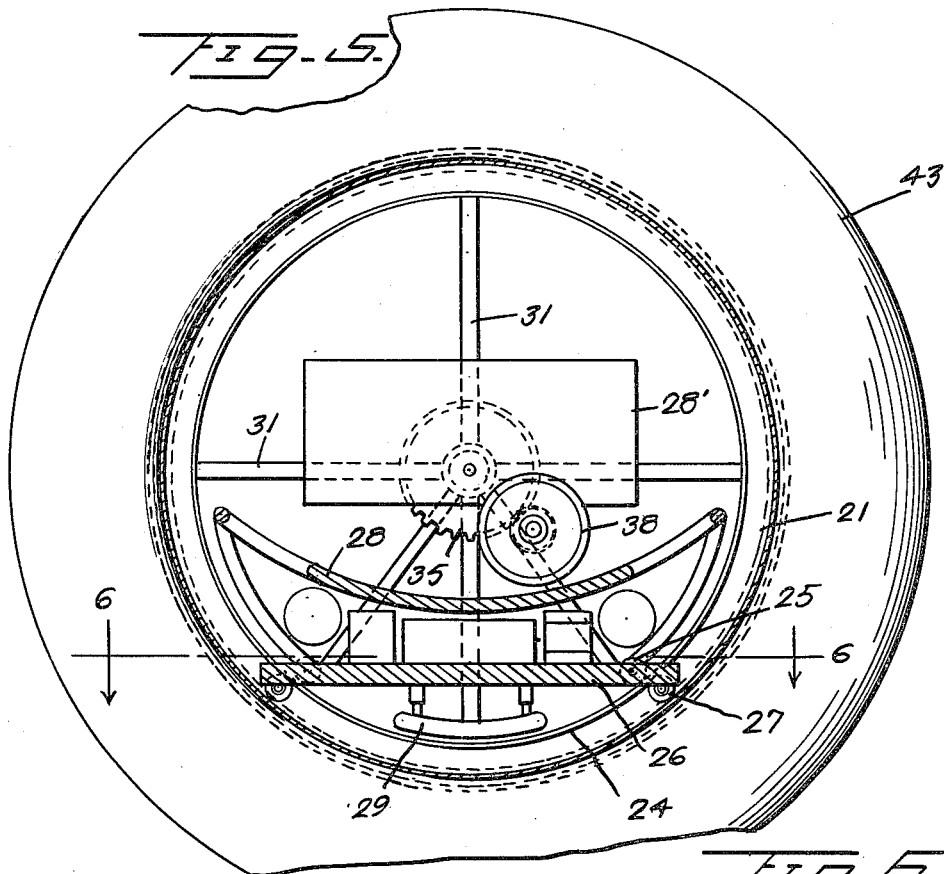
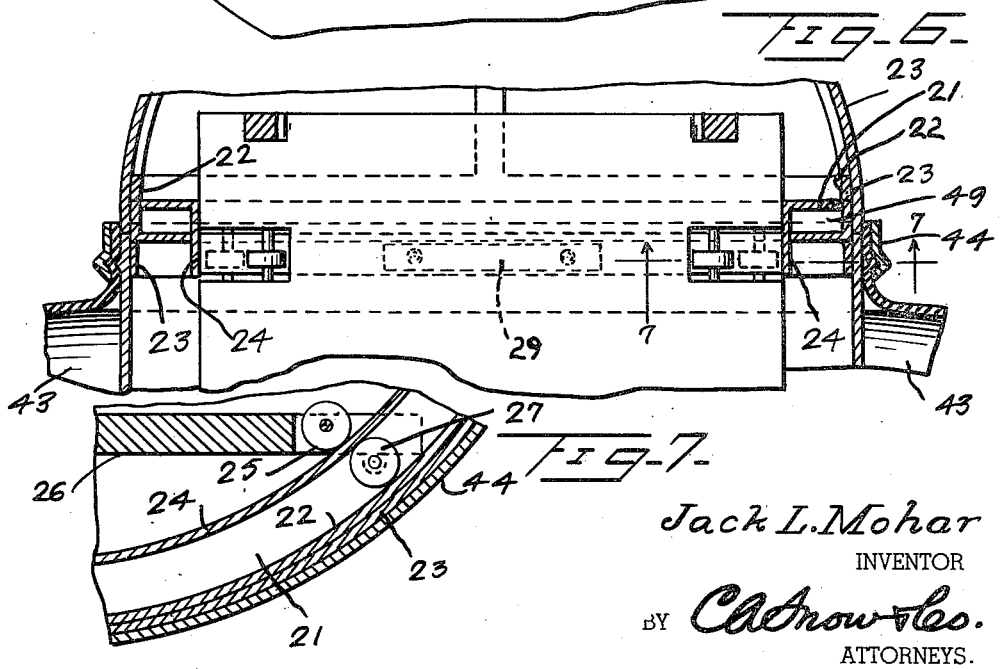
Jack L. Mohar
INVENTOR
BY C.A. Snow & Co.
ATTORNEYS.

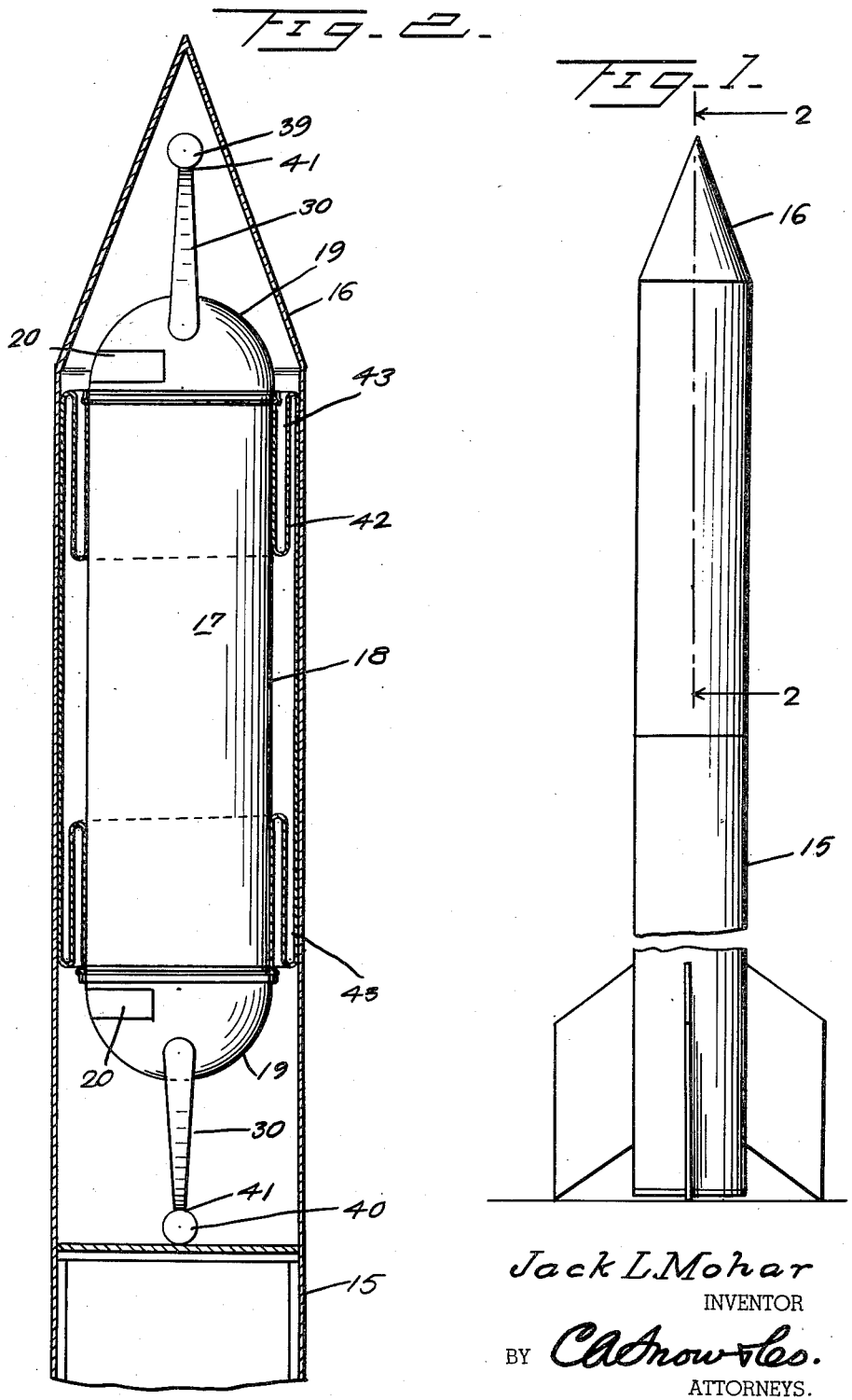

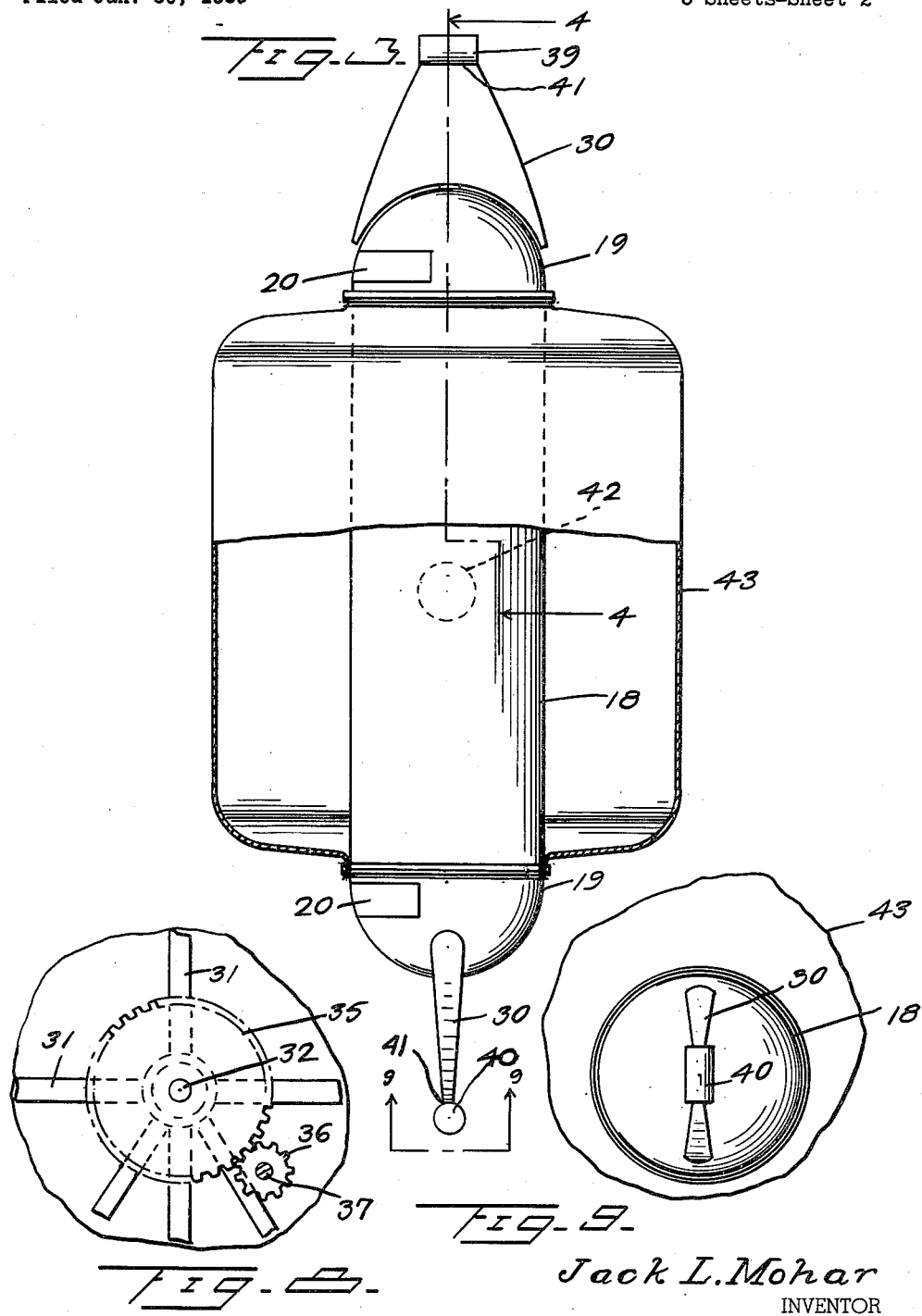

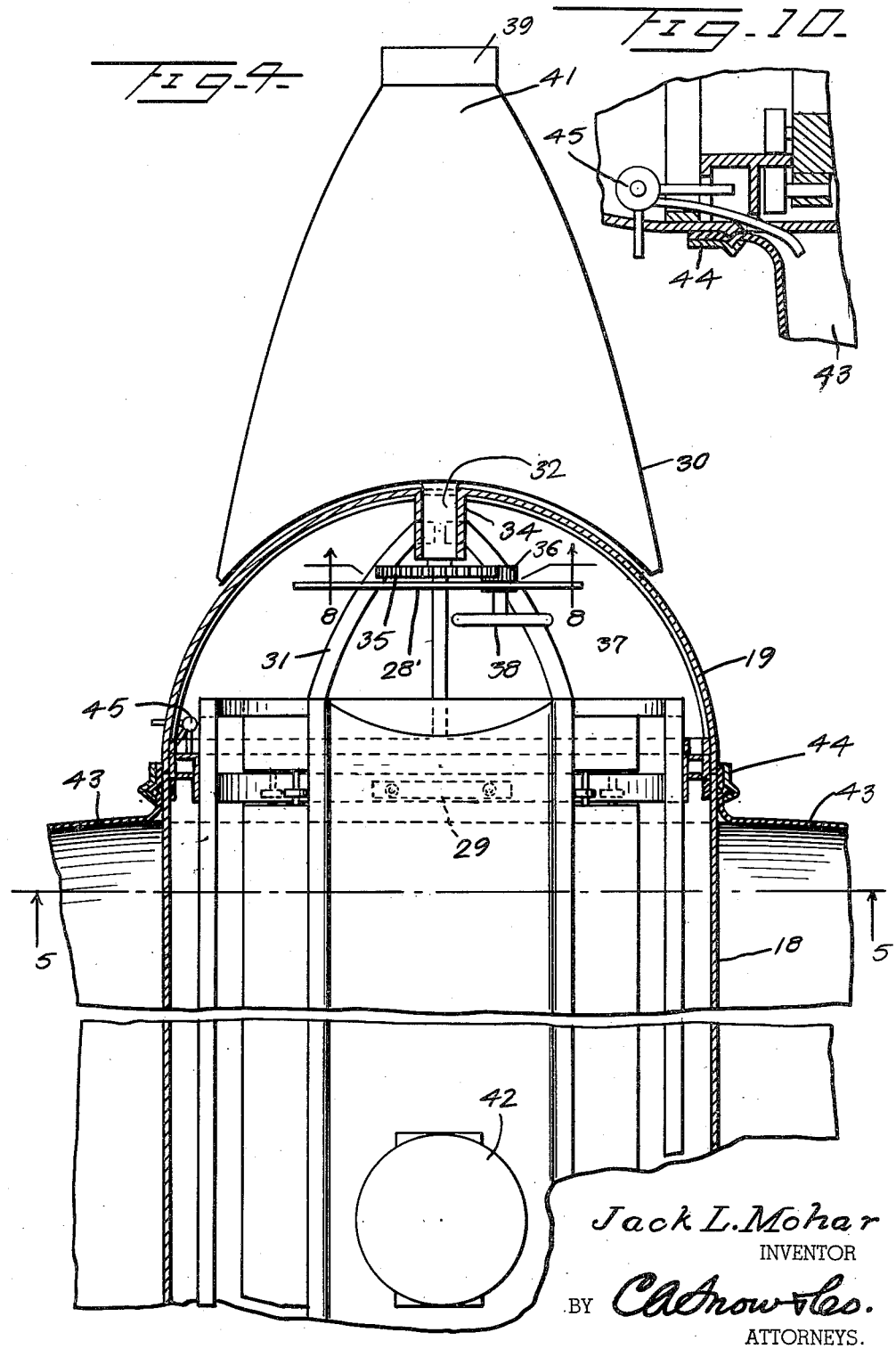

Sept. 11, 1962  J. L. MOHAR  3,053,476
SPACE VEHICLE

Filed Jan. 30, 1959  5 Sheets-Sheet 5

Jack L. Mohar
INVENTOR

BY Chnowles.
ATTORNEYS.

3,053,476
SPACE VEHICLE
Jack L. Mohar, 41 W. Arbor St., Long Beach, Calif.
Filed Jan. 30, 1959, Ser. No. 790,207
3 Claims. (Cl. 244—1)

This invention relates to space vehicles and has as one of its objects the provision of a structure having its air drag producing mechanism collapsible so that it may be placed in the nose cone of a rocket and shot into space, then inflated for reentry into the atmosphere, and landing without damage to the cargo, or injury to the crew or passengers.

Another object of this space vehicle is the provision of means for maintaining the passenger cargo platform at an even keel regardless of the rolling of its cylindrical body while in flight.

Still another object of this space vehicle is the provision for full directional and speed control at all times, regardless of the angle at which it is flying.

Other and further objects of this invention will be hereinafter described and the novel features thereof defined in the appended claims.

Referring to the drawings:

FIGURE 1 is a side elevational view of this invention totally enclosed within a rocket and ready for flying into space.

FIG. 2 is a sectional view taken substantially along line 2—2 of FIG. 1 as viewed in the direction indicated by the arrows.

FIG. 3 is a plan view of this invention.

FIG. 4 is a sectional view taken substantially along line 4—4 of FIG. 3 as viewed in the direction indicated by the arrows, but with the wing and platform rotated ninety degrees.

FIG. 5 is a sectional view taken substantially along line 5—5 of FIG. 4 as viewed in the direction indicated by the arrows.

FIG. 6 is a sectional view taken substantially along line 6—6 of FIG. 5 as viewed in the direction indicated by the arrows.

FIG. 7 is a sectional view taken substantially along line 7—7 of FIG. 6 as viewed in the direction indicated by the arrows.

FIG. 8 is a sectional view taken substantially along line 8—8 of FIG. 4 as viewed in the direction indicated by the arrows.

FIG. 9 is a view taken substantially along line 9—9 of FIG. 3 as viewed in the direction indicated by the arrows.

FIG. 10 is a fragmentary detail of this invention.

Similar reference characters refer to similar parts throughout the several views of the drawings.

Figure 11:
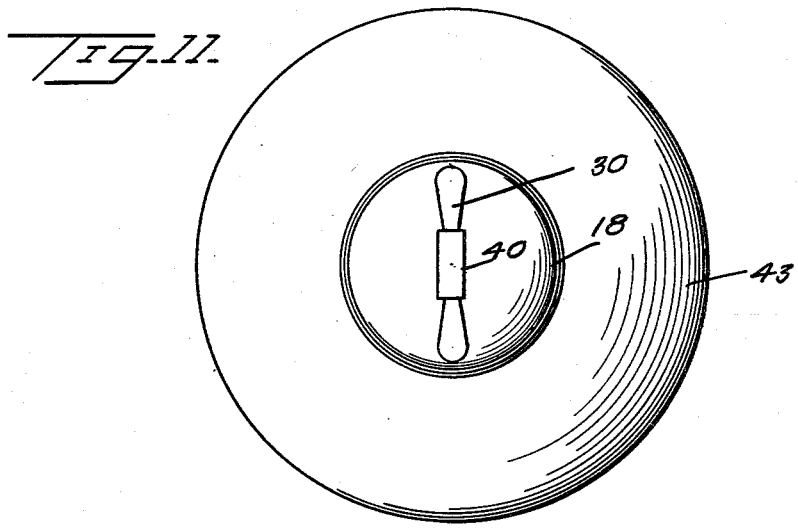
FIG. 11 is an end view of this space vehicle in flight.

Having reference now to the drawings in detail, and in particular to FIGS. 1 and 2, there is generally indicated by the reference character 15 a vehicle-carrying rocket having a detachable nose cone 16 that is blown off in space before the space vehicle 17 carried within the rocket is launched for its flight and back to earth. The space vehicle 17 consists of a cylindrical body 18 having transparent spherical ends 19 in which access doors 20 are located. The body 18 which is constructed in accordance with good practice within the art, contains a plurality of circular supporting channels 21 in longitudinal spaced relation to one another, the full length of the said body. The circular supporting channels 21 have a flange 22 to which skin 23 of the vehicle is attached, as well as an inside flange 24 that provides additional rigidity to the vehicle. Rollers 25 are secured to the platform 26 which they support by riding on the top of flange 24 of the circular supporting channel 21. This platform carries the crew, passengers and cargo, as well as many mechanisms and pieces of equipment necessary in a vehicle of this kind. Additional rollers 27 secured to the under side of the platform 26 ride on both flange 23 and 24 of channel 21, as is clearly shown in the appended drawings.

Thus it will be readily seen that platform 26 will now rotate freely within the body 18 of this vehicle, and because of the gyroscope hereinafter described, will stay at an even keel regardless of the rotation of the craft.

A pilot's seat 28 located in each end of the vehicle, is secured to the platform 26, a braking mechanism 29 being located under both pilot's seats 28 and the platform 26, to which it is attached. This braking mechanism may be of any conventional type, hydraulic, electric or mechanical, insolong as it is designed to operate on top of flanges 24 of channels 21, in a manner that will be explained in the operation of the vehicle.

Looking again at the ends of the space vehicle, it is seen that a wing 30 is secured to the framework 31 of the transparent spherical end 19 by means of a shaft 32 which is secured at one end to the structural member 33 of said wing 30, and projects through support bearings 34 which are held by the end of framework 31. A ring gear 35 is fitted on the end of shaft 32 and is rotated by pinion 36 on the end of shaft 37 of steering wheel 38, which is in mesh therewith.

Power plants 39 and 40 are located on the ends 41 of wings 30. The power plants may be jet or rocket propulsion units as shown in the drawings.

Since this vehicle is subject to complete rotation in any plane, it is necessary to provide some means of maintaining the platform 26 with the crew and passengers, at an even keel at all times. This is accomplished by the use of a gyroscope 42 which is securely mounted on the platform 26, as previously mentioned.

A balloon-like gas bag 43 is secured to the cylindrical body 18 against which it folds as shown in FIG. 2. The ends of gas bag 43 are held in place against the spherical body 18 by means of bands 44 that completely encircle the cylindrical body 18 in such a way as to form a leak-proof joint. The balloon-like gas bag 43 is inflated with helium or any other desired gas carried under pressure in containers within the spherical body of this space ship.

The gas container, inflating tubes and mechanism are not a part of this invention, and are therefore not shown in the drawings. However, it should be stated that the gas for inflating bags 43 will pass through a regulating valve 45 that is located near the pilot seats 28.

Figure 12:
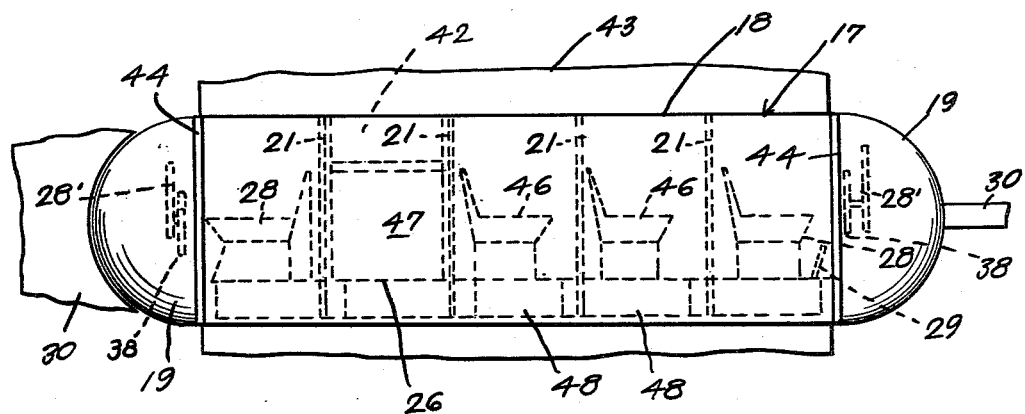
FIG. 12 is an elevational view of the body of this space vehicle showing its cabin arrangement.
Figure 13:
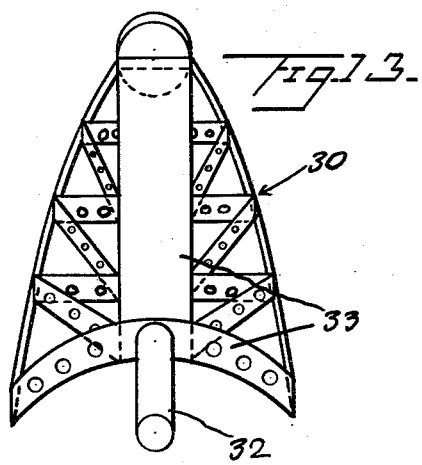
FIG. 13 is a pictorial view of the wing structure of this invention without its covering.

The vehicle is placed in a horizontal position on the ground so that passengers may enter the craft through doors 20 and seat themselves in seats 46 while the pilots occupy seats 28. Cargo 47 is then secured to the platform 26, and fuel for the craft is placed in tanks 48 located underneath platform 26. A typical arrangement of the interior of this space ship is shown in FIG. 12. However, other arrangements may be made to meet various requirements of use, such as an all cargo carrier, a tanker, or an all passenger craft in which no cargo will be carried. It is to be understood that there are many ways in which the loading and launching of this craft may be accomplished. The vehicle may be first loaded as described, and then placed within rocket 15 by means of a crane, or it may be placed empty within the rocket and then loaded before the nose cone 16 is placed on the end of the rocket. The rocket 15 may be made in two halves with a detachable nose cone 16, so that when the vehicle 17 is ready to be launched into space, all that will be necessary will be to blow off the nose cone 16 and propel the vehicle 17 out the end of rocket 15. This of course will all be accomplished after the rocket has been propelled many miles into space. Gas bags 43 are automatically inflated as the vehicle leaves the rocket.

Another method for launching this space vehicle is when the craft has reached a predetermined latitude, the balloon-like gas bags 43 will automatically become inflated, or they may be inflated by the pilot within the craft, the expansion of the gas bags due to inflation breaking open the rocket 15 and thus releasing the craft. Regardless of how this space vehicle is released from the rocket, the inflated gas bags 43 will now give the craft a very high air drag and thus it will descend slowly to earth, where it may land on a mud, sand, snow or water surface without damage to its structure or cargo.

It is also to be noted that since this vehicle will be flying at a very high speed when it leaves the rocket, no actual lift will be required from the wings 30, and that for all practical purposes they will serve merely to steer the vehicle, since they each may rotate in one hundred and eighty degree movement about the transparent spherical ends 19.

It will be understood from an examination of FIGS. 4 and 8 that the pilot will control the movement of wings 30 by steering wheel 38 through the previously described mechanism. The thrust of the power units 39 and 40 will also greatly assist in the steering of the vehicle. In fact, the power plants 39 and 40 may be rotated so as to point their thrust downward, and thus act as an air brake in slowing the craft as it comes in for a landing. The mechanism for rotating power plants 39 and 40 at the ends 41 of wings 30 has not been shown in this application, as it is achieved by any means known to those in the art of space vehicle design and construction. In fact, only the major details of this vehicle are included in this application, and only a few of the modifications to the vehicle are herein given. One that has not been previously mentioned is that helium or other inflating gas for bags 43 may be carried inside of circular supporting ring 21, since this ring may be so formed that it is a leakproof hollow chamber 49. Thus the total volume of the plurality of circular rings 21 used in the construction of body 18 of this craft will be more than sufficient for the required amount of gas for bags 43.

One other modification may be mentioned at this time, namely, if so desired, the ship can be controlled entirely by radar and proper electromechanical radar controlling units secured to steering wheel 38 and other necessary controls, and thus the space normally occupied by pilots may be used for additional passengers or cargo.

In all designs of this vehicle, an instrument panel 28' is located in front of the pilot's seat 28.

From the foregoing it will now be seen that there is herein provided an improved space vehicle which accomplishes all of the objects of this invention, and others, including many advantages of great practical utility and commercial importance.

As many embodiments may be made of this inventive concept, and as many modifications may be made in the embodiments hereinbefore shown and described, it will be understood that all matter herein is to be interpreted merely as illustrative, and not in a limiting sense.

I claim:
1. In a vehicle for space and air travel of the character described the combination of a cylindrical body in which fuel, passengers, cargo, crew and operating mechanism are carried, a giant inflatable balloon tire member surrounding said body between the ends thereof, means for securing said tire member to said cylindrical body, a controllable wing member on each end of said body, power plants mounted on ends of said wings, a supporting shaft rigidly secured to inboard ends of said wings, bearings to support said shaft and reduction gears for controlling said wings.

2. In a vehicle for space and air travel of the character described, the combination of a cylindrical body, a giant inflatable balloon tire member surrounding said cylindrical body between the ends thereof, means for securing said balloon tire member to said cylindrical body, a plurality of circular-hollow supporting members arranged in longitudinal spaced relation to each other within said body, a platform within said body, a plurality of rollers secured to said platform, said rollers riding on said circular supporting members, whereby said platform rotates within said body, means for keeping said platform normally in horizontal position regardless of angle or rotation of said body, suitable brakes secured to said platform so arranged to engage said circular supporting members, controllable wings and bearings to support said wings secured to each end of said cylindrical body.

3. In a vehicle for space and air travel of the character described, the combination of a cylindrical body, a giant inflatable balloon tire member surrounding said cylindrical body between the ends thereof, a controllable wing member on each end of said cylindrical body, said cylindrical body comprising a skin, a plurality of circular supporting members in longitudinal spaced relation to each other mounted within said body, a platform within said body, a plurality of rollers secured to said platform, said rollers riding on said circular supporting members, said supporting members forming chambers for storage of gas for inflating said balloon tire, means of discharging said gas from said supporting members to said balloon tire member.

References Cited in the file of this patent
UNITED STATES PATENTS

| | | |
|---|---|---|
| 573,010 | Langer | Dec. 15, 1896 |
| 1,510,607 | Polk | Oct. 7, 1924 |
| 1,622,208 | Roberts | Mar. 22, 1927 |
| 1,811,394 | Hornsby | June 23, 1931 |
| 2,452,783 | Nebesar | Nov. 2, 1948 |
| 2,497,153 | Cosakis | Feb. 14, 1950 |
| 2,692,094 | Brown | Oct. 19, 1954 |
| 2,763,447 | Carrau | Sept. 18, 1956 |

FOREIGN PATENTS

| | | |
|---|---|---|
| 437,763 | France | Feb. 26, 1912 |